United States Patent [19]

Lecrone

[11] Patent Number: 5,350,055
[45] Date of Patent: Sep. 27, 1994

[54] CONVEYOR MECHANISM HAVING SELECTIVELY POSITIONABLE PUSHING FINGERS AND HAVING FINGER POSITIONING CAM ARRANGEMENT

[75] Inventor: Dale S. Lecrone, Jackson, Mich.

[73] Assignee: LeMatic, Inc., Jackson, Mich.

[21] Appl. No.: 33,231

[22] Filed: Mar. 16, 1993

[51] Int. Cl.5 .............................................. B65G 19/00
[52] U.S. Cl. ................................... 198/718; 198/732; 198/735.1
[58] Field of Search ...................... 198/718, 732, 735.1

[56] References Cited

U.S. PATENT DOCUMENTS

| | | |
|---|---|---|
| 1,116,406 | 11/1914 | Fleischer . |
| 1,440,708 | 1/1923 | Tollefson . |
| 1,740,582 | 12/1929 | Farmer . |
| 1,864,704 | 6/1932 | Wickman . |
| 3,117,667 | 1/1964 | Tichy et al. .................. 198/732 |
| 3,128,875 | 4/1964 | Kay et al. . |
| 3,527,336 | 9/1970 | Johnston . |
| 3,845,852 | 11/1974 | Langen et al. . |
| 3,917,053 | 11/1975 | Matsuyama . |
| 4,342,387 | 8/1982 | Gray . |
| 4,374,496 | 2/1983 | Hanna ........................... 198/732 |
| 4,417,653 | 11/1983 | Zwezerynen .................. 198/732 |
| 4,505,093 | 3/1985 | Johnson ......................... 198/732 |
| 5,125,501 | 6/1992 | Dojan ............................. 198/732 |
| 5,137,140 | 8/1992 | Lecrone . |

FOREIGN PATENT DOCUMENTS 688386 9/1979 U.S.S.R. .

Primary Examiner—Joseph E. Valenza
Attorney, Agent, or Firm—Flynn, Thiel, Boutell & Tanis

[57] ABSTRACT

A conveyor includes two spaced guide rails over an upwardly facing support surface which can slidably support an article to be conveyed, the support surface having a plurality of parallel slots. Two movably-supported chains below the support surface support a plurality of pushing assemblies each having several central fingers which can project upwardly above the support surface through respective slots and having two outermost fingers which can move between positions projecting above the support surface through respective slots and disposed below the support surface. An arrangement responsive to the positions of the guide rails automatically positions the outer pushing fingers in one of the two positions thereof.

23 Claims, 4 Drawing Sheets

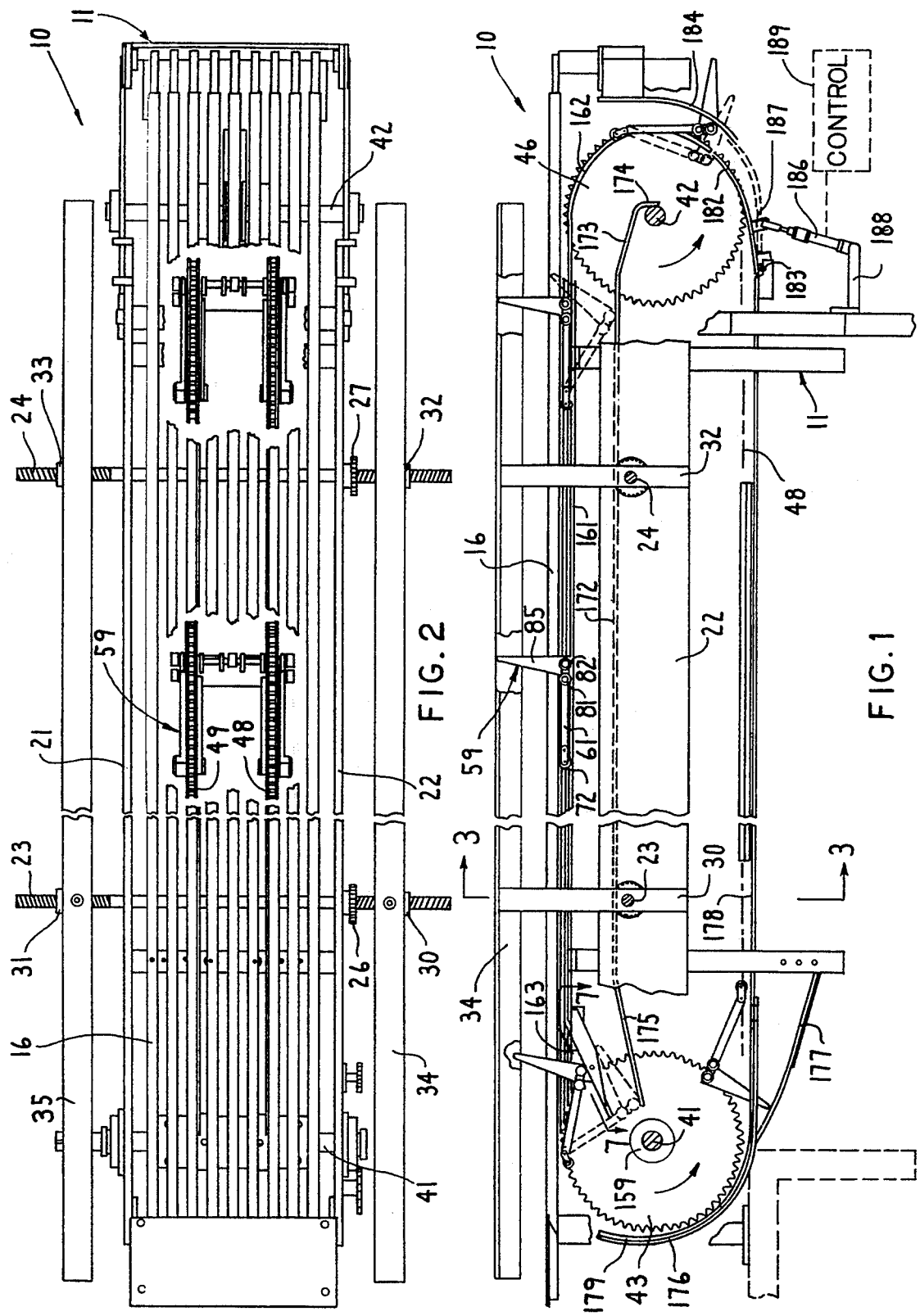

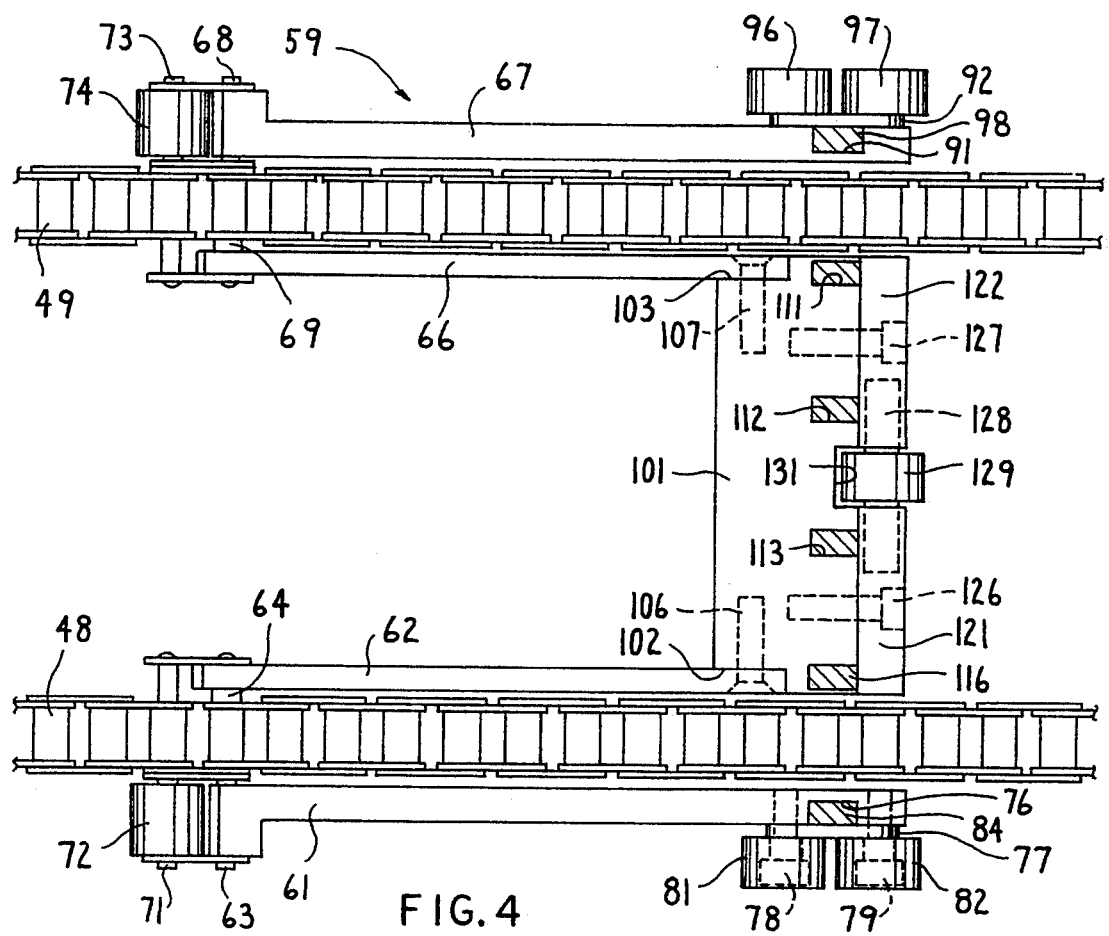
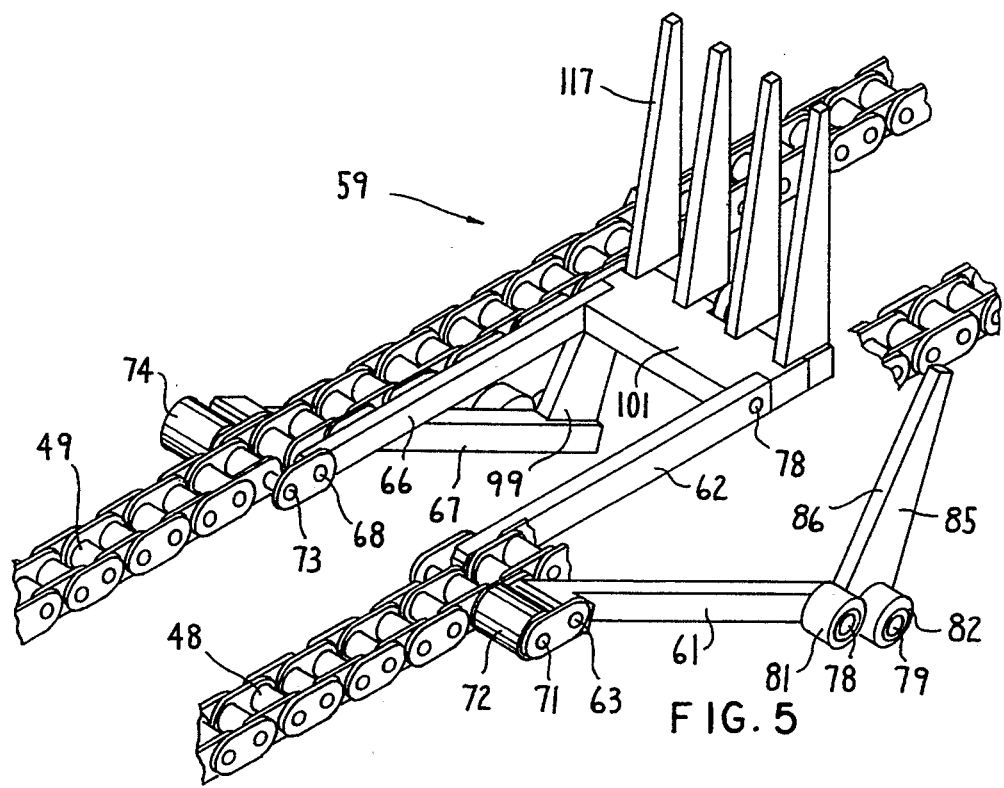

CONVEYOR MECHANISM HAVING SELECTIVELY POSITIONABLE PUSHING FINGERS AND HAVING FINGER POSITIONING CAM ARRANGEMENT

FIELD OF THE INVENTION

This invention relates to a conveyor in which a pushing assembly pushes an article across a surface between two guide rails and, more particularly, to such a conveyor in which the effective pushing width of the pushing assembly is automatically adjusted in response to movement of the guide rails.

BACKGROUND OF THE INVENTION

One type of conventional conveyor has an upwardly facing surface which can slidably support articles to be conveyed, and has a plurality of pushing assemblies at spaced locations along an endless chain, each pushing assembly moving horizontally above the surface along one reach of the chain and having a plurality of rigid, downwardly projecting fingers which can engage the article and slide it along the surface. The article is located between two guide rails, and the distance between the guide rails can be adjusted to accommodate articles of different sizes. When the distance between the guide rails is increased or decreased, different pushing assemblies having a different effective width are used. In particular, every pushing assembly on the endless chain is manually removed from the chain and is replaced with a similar pushing assembly of larger or smaller effective width. Since this conventional type of machine typically has 10 to 15 pushing assemblies on the chain, is a relatively tedious and time consuming task to effect such a change in the configuration of the machine.

The assignee of the present invention has already developed an improved conveyor, which is disclosed in U.S. Ser. No. 07/789,415, filed Nov. 1, 1991, now U.S. Pat. No. 5,137,140. This improved conveyor has pushing assemblies with effective widths which are adjustable, and has an arrangement responsive to movement of the guide rails for automatically effecting adjustment of the effective widths of the pushing assemblies. This existing conveyor has been very advantageous in practice. However, while the particular mechanism provided in this existing conveyor to adjust the effective widths of the pushing assemblies is highly satisfactory for certain types of conveyors, there are other types of conveyors for which it is less satisfactory.

Accordingly, an object of the present invention is to provide an improved version of the pushing assemblies with adjustable widths and the mechanism which adjusts the widths of the pushing assemblies, for use in conveyors in which the mechanism disclosed in the prior application is less practical.

SUMMARY OF THE INVENTION

The objects and purposes of the invention, including those set forth above, are met according to one form of the present invention by providing an apparatus which includes an upwardly facing support surface, a movably supported drive member and a drive arrangement for effecting movement of the drive member along a path of movement which includes a portion approximately parallel to the support surface, a pushing arrangement for sliding an article in a direction of movement on the support surface, the pushing arrangement including a first pushing portion supported on the drive member and engageable with an article on the surface as the first pushing portion moves with the drive member in the direction of movement, and a second pushing portion supported for movement relative to the drive member between operational and retracted positions in which it is respectively engageable with and free of engagement with an article on the surface as the second pushing portion moves along the portion of the path of movement, first and second elongate guide surfaces extending substantially parallel to each other and to the support surface, the second pushing portion being coupled to a guide part which moves along a respective one of the guide surfaces as the drive member moves along the portion of the path of movement to thereby position the second pushing portion in a respective one of the operational and retracted positions with respect to the drive member, a movable guide member provided at a location along the path of movement prior to the portion thereof and engageable with the guide part, a control arrangement for selectively positioning the guide member in a selected one of two positions, the guide part engaging the guide member and being guided by the guide member in response to movement of the drive member to one of first and second positions with respect to the guide member, and an arrangement responsive to the guide member being in its respective positions for guiding the guide part into engagement with a respective one of the first and second guide surfaces.

A different form of the present invention involves the provision of an upwardly facing support surface having a slot therein, a drive member supported for movement along a path of movement which includes a portion substantially parallel to the slot, a pushing arrangement for sliding an article along the support surface in a direction parallel to the slot, the pushing arrangement including a support member which is movably supported on the drive member and which has thereon a pushing portion and a guide part, an upwardly facing guide surface disposed below and extending parallel to the support surface and merging at its downstream end into a downwardly inclined extension, the guide part being engageable with the guide surface as the drive member moves along the portion of the path of movement to maintain the support member in a position in which the pushing portion projects upwardly through the slot and above the support surface, and a proximity-maintaining arrangement for ensuring that the guide part moves downwardly along the inclined extension.

Yet another form of the present invention involves the provision of an upwardly facing support surface having a plurality of spaced and parallel slots, two elongate drive chains having respective portions disposed below and extending parallel to the support surface in the slots, a drive arrangement for effecting simultaneous lengthwise movement of the portions of the drive chains in the same direction at the same speed, first and second elongate support members disposed on opposite sides of the first chain and each having a first end supported on the first chain for pivotal movement about a pivot axis extending transversely to the chains and approximately parallel to the support surface, and third and fourth support members disposed on opposite sides of the second chain and each having a first end supported on the second chain for pivotal movement about the pivot axis, a connecting member which extends between and is fixedly coupled to second ends of the second and third support members, a first guide roller supported on the connecting member for rotation about an axis parallel to the pivot axis, a plurality of upwardly projecting first pushing fingers provided on the connecting member, a first upwardly facing guide surface disposed below and extending parallel to the support surface and the slots therein, the first guide roller rolling along the first guide surface with the first pushing portions projecting upwardly through respective slots in the support surface in response to movement of the chains, second and third guide rollers supported respectively on the first and fourth support members at the second ends thereof, upwardly projecting second and third pushing fingers provided on the first and fourth support members, and second and third upwardly facing guide surfaces each parallel to the first guide surface and each engageable with a respective one of the second and third guide rollers for maintaining the first and fourth support members in positions in which the pushing fingers thereon project upwardly through respective slots in the support surface.

Another form of the present invention involves the provision of an upwardly facing support surface, a drive member supported for movement along a path of movement, an elongate support member having a first end supported on the drive member for pivotal movement about a pivot axis transverse to a direction of movement of the drive member and approximately parallel to the support surface, an arrangement supporting a first guide roller adjacent the first end of the support member for rotation about an axis parallel to the pivot axis, an arrangement supporting a second guide roller on the support member adjacent a second end thereof for rotation about an axis substantially parallel to the pivot axis, a pushing portion projecting outwardly from the second end of the support member, first and second vertically spaced guide surfaces each extending approximately parallel to the support surface, wherein when the second guide roller is respectively engaging the first and second guide surfaces as the guide member moves along the portion of the path of movement the pushing portion is respectively disposed in positions engageable with and spaced from an article on the support surface, a guide member movable between first and second positions and a control arrangement which can pivot the guide member and yieldably resist movement of the guide member away from a selected one of its positions, wherein as the first guide member moves with the drive member along the path of movement while the guide member is in the selected position, the first guide roller engages the guide member and forces the guide member to move away from the selected position against the urging of the control arrangement, the guide member thereafter being returned by the control arrangement to the selected position and the second guide roller being thereafter guided by the guide member and a guide arrangement to one of the first and second guide surfaces.

BRIEF DESCRIPTION OF THE DRAWINGS

A preferred embodiment of the present invention is described in detail hereinafter with reference to the accompanying drawings, in which:

FIG. 1 is a fragmentary side view of an infeed conveyor which embodies the present invention, with two guide rails omitted for clarity;

FIG. 2 is a fragmentary top view of the infeed conveyor of FIG. 1;

FIG. 4 is a top view in an enlarged scale and partly in section of a pushing assembly which is shown in FIG. 2;

FIG. 5 is a perspective view of the pushing assembly of FIG. 4;

DETAILED DESCRIPTION

Figure 3:
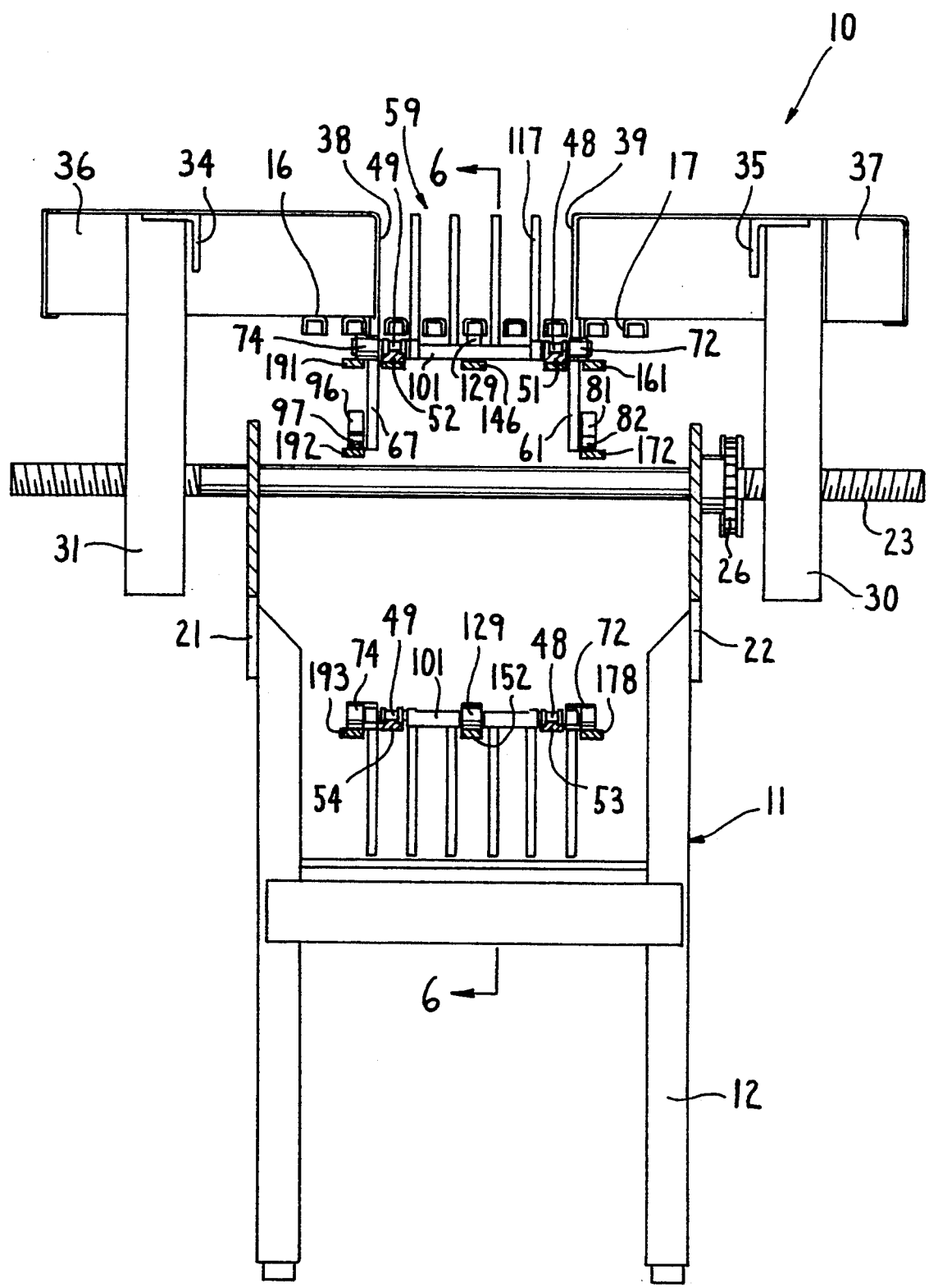
FIG. 3 is a sectional end view of the conveyor of FIG. 1, taken along the line 3—3 in FIG. 1, but with the two guide rails depicted.

FIGS. 1–3 depict an infeed conveyor 10 which embodies the present invention. The conveyor 10 is an improved conveyor of the general type shown in U.S. Ser. No. 07/789,415 filed Nov. 1, 1991, now U.S. Pat. No. 5,137,140 which is a continuation of U.S. Ser. No. 07/573,244 filed Aug. 24, 1990, now abandoned, the disclosures of which are hereby incorporated herein by reference.

The conveyor 10 includes a stationary frame 11 which, as best seen in FIG. 3, includes and is supported by several legs 12. As shown in FIGS. 2 and 3, the frame 11 supports a plurality of parallel and horizontally extending bars 16 which have a uniform spacing between them so as to define a plurality of parallel slots 17. The top surfaces of the bars 16 collectively define an upwardly facing support surface. Products such as bakery goods are slidingly supported on and pushed along this upwardly facing support surface parallel to the slots 17 in a manner described in more detail later.

Referring to FIG. 3, the frame 11 also includes two spaced vertical plates 21 and 22 which rotatably support two transversely extending horizontal shafts 23 and 24. Each shaft has ends which are threaded oppositely to each other. Each of the shafts 23 and 24 has a spur gear 26 or 27 secured thereto, and the gears 26 and 27 are coupled to each other by a drive chain so that, when the shaft 23 is rotated by a conventional and not-illustrated drive mechanism, the shaft 24 will be rotated simultaneously and synchronously with the shaft 23.

The threaded ends of shaft 23 respectively engage threaded holes in two vertical supports 30 and 31, and the threadedends of shaft 24 engage threaded holes in two vertical supports 32 and 33. An elongate L-shaped channel 34 extending parallel to the bars 16 is welded to the upper ends of the supports 30 and 32, and a similar channel 35 is welded to the upper ends of the supports 31 and 33. FIG. 3 shows two guide members or guide rails 36 and 37 which are each bolted to a respective one of the channels 34 and 35, the inner ends of the guide members 36 and 37 each being disposed just above the bars 16 and having respective inwardly facing and parallel guide surfaces 38 and 39. For clarity, the guide members 36 and 37 have been omitted in FIGS. 1 and 2.

When the shafts 23 and 24 are rotated in one direction, the guide members 36 and 37 are moved toward each other in horizontal directions perpendicular to the slots 17, whereas when the shafts 23 and 24 are rotated in the opposite direction, the guide members 36 and 37 move away from each other. This adjustment of the distance between the guide members permits the conveyor to be quickly and easily adapted for use with products of different widths.

Referring to FIGS. 1 and 2, the frame 11 rotatably supports two spaced shafts 41 and 42. The shaft 41 has secured thereon two spaced sprockets 43 and 44 (FIGS. 1 and 6), and the shaft 42 has secured thereon two spaced sprockets 46 and 47. An endless drive chain 48 extends around the sprockets 43 and 46, and another endless drive chain 49 extends around the sprockets 44 and 47. The shaft 41 is rotated in a counterclockwise direction in FIG. 1 by a conventional and not-illustrated drive arrangement, the shaft 41 in turn rotating the sprockets 43 and 44 and effecting lengthwise movement of the chains 48 and 49.

Referring to FIG. 3, two elongate and horizontally extending chain supports 51 and 52 are supported on the frame 11, and are disposed beneath and slidably support the upper reaches of the chains 48 and 49. Similarly, two elongate and horizontally extending chain supports 53 and 54 are provided beneath and slidably support the lower reaches of the chains 48 and 49.

Provided at uniformly spaced locations along the length of the chains 48 and 49 are a plurality of identical pushing assemblies 59, one of which is shown in FIGS. 4 and 5. Referring to FIGS. 4 and 5, each pushing assembly 59 includes two elongate support members 61 and 62 which are disposed on opposite sides of the chain 48 and which each have one end pivotally supported on the chain by a pin 63, a washer or spacer 64 being provided on the pin 63 between the chain and the support member 62. Two similar support members 66 and 67 have ends pivotally supported on the chain 49 by a pin 68, a washer or spacer 69 being provided between support member 66 and chain 49.

The chain link having the pin 63 also has at its opposite end a pin 61 which rotatably supports a roller 72 adjacent the end of support member 61, and the chain link having pin 68 also has a pin 73 which rotatably supports a roller 74 adjacent the end of support member 67.

Figure 8:
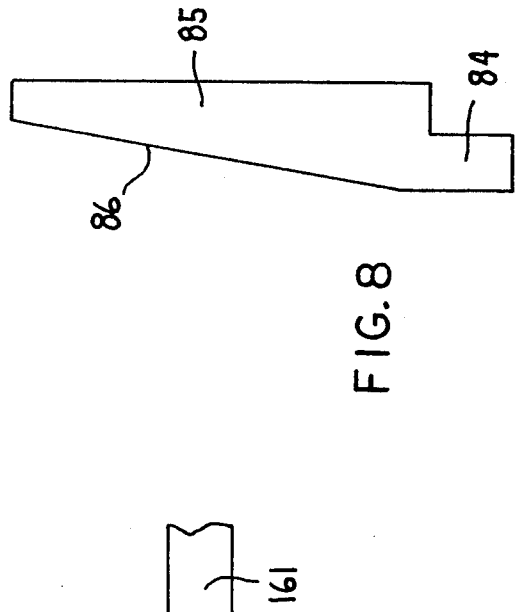
FIG. 8 is a view of a pushing finger which is a component of the pushing assembly of FIGS. 4 and 5.

The support member 61 has, in an outer surface and at an end remote from the pin 63, a rectangular recess or groove 76. A plate 77 is disposed against this outer surface of the support member 61, and is fixedly secured to the support member by two bolts 78 and 79 which each rotatably support a respective metal guide roller 81 or 82. A triangular pushing finger 85 has at its lower end a rectangular projection 84 which extends into the rectangular recess 76 and is clamped in the recess 76 by the plate 77. The pushing finger 85 is itself shown in FIG. 8. The pushing finger 85 has on a forward side thereof an inclined pushing surface 86 which extends upwardly and rearwardly.

A similar arrangement is provided at the outer end of the support member 67, including a recess 91, a plate 92, rollers 96 and 97, and a pushing finger 99 having a projection 98 at the lower end, the finger 99 being identical to the finger 85.

A transversely extending connecting member 101 has two rectangular recesses 102 and 103 which each receive an outer end of a respective one of the support members 62 and 66, the support members 62 and 66 being fixedly secured to the support member 101 by respective bolts 106 and 107. The connecting member 101 also has in a rear side thereof four rectangular recesses 111–114 which each receive a rectangular projection 116 provided at the lower end of a respective one of four pushing fingers 117, the pushing fingers 117 each being identical to the pushing finger 85 of FIG. 8. A plate 121 is secured to the rear side of the connecting member 101 by a bolt 126 and fixedly clamps the projections 116 of two pushing fingers in recesses 113 and 114, and in a similar manner a plate 122 is secured to the connecting member 101 by a bolt 127 and fixedly clamps the projections 116 of two pushing fingers in the recesses 111 and 112.

A cylindrical pin 128 has its ends disposed in blind bores provided in the plates 121 and 122, and a guide roller 129 is rotatably supported on the pin 129 between the plates 121 and 122, the connecting member 101 having a recess 131 to permit free rotation of the roller 129.

The structure provided on the frame 11 to guide and position the pushing assemblies 59 will now be described, beginning with reference to FIG. 6. A plastic sleeve or hub 136 is provided on the shaft 41 between the two sprockets 43 and 44. A T-shaped plastic guide member 137 is fixedly supported on the shaft 42, and has at the intersection of the cross part and stem an opening 138 which snuggly receives the shaft 42. The cross part of the T has arcuate surfaces 141 and 142 at opposite ends which are each concentric to the shaft 42, and the outer end of the stem has an arcuate surface 143 which is also concentric to the shaft 42. Each of the surfaces 141–143 has at opposite axial edges an outwardly projecting arcuate flange. The member 137 could alternatively be a circular disk, but the T-shaped configuration uses less plastic and is therefore cheaper.

An upper center guide member 146 (FIGS. 3 and 6) is disposed intermediate and extends parallel to the upper chain supports 51 and 52, the upstream end of the guide member 146 being adjacent and vertically aligned with the arcuate surface 143 at the upper end of the guide member 137. The downstream end of the horizontal guide member 146 merges into a downwardly inclined guide extension 147, which extends toward the upper side of the hub 136. One of the bars 16 has bolted to it one leg of a V-shaped bracket 148, the other leg of the bracket 148 supporting an inclined guide plate 149 which is spaced above and extends parallel to the inclined guide extension 147.

At a location spaced vertically below the upper center guide member 146 is an elongate horizontal lower center guide member 152, which extends parallel to the guide member 146. At its upstream end, the guide member 152 merges into an approximately arcuate guide extension 153, which curves upwardly around shaft 41 to a location adjacent the outer end of guide plate 149. At its downstream end, the guide member 152 merges into a further arcuate guide extension 154, which is approximately concentric to the shaft 42 and has a radius greater than that of the sprocket 47.

Figure 7:
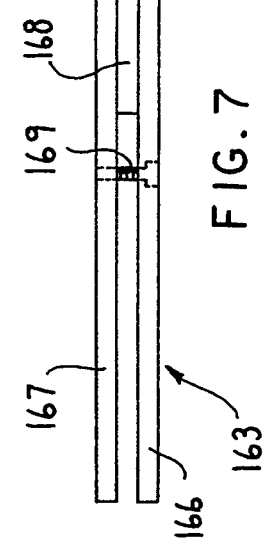
FIG. 7 is a view of a part of the conveyor taken along the line 7—7 in FIG. 1.

Referring to FIG. 1, the shaft 41 carries on the axially outer side of the sprocket 43 a plastic hub 159. Referring to FIGS. 1 and 3, an elongate upper outer guide member 161 is provided on the opposite side of the chain support 51 from the guide member 146, and extends parallel to the guide member 146. At its upstream end, guide member 161 merges into an arcuate guide extension 162 which extends approximately concentrically with respect to shaft 42, the arcuate extension 162 having a radius slightly less than the radius of sprocket 46. At its downstream end, guide member 161 merges into a downwardly inclined guide extension 163, which extends toward the upper side of the hub 159. As best seen in FIG. 7, the guide member 163 is forked to define two spaced, parallel legs 166 and 167. A magnet 168 is provided between the legs 166 and 167, and a bolt 169 presses the legs 166 and 167 toward each other so that the magnet 168 is fixedly clamped between the legs 166 and 167.

Referring again to FIGS. 1 and 3, a short distance directly beneath the horizontal guide member 161 is a further horizontal guide member 172. At its upstream end, guide member 172 merges into an inclined guide extension 173 which extends downwardly over the top of shaft 42 and has an end portion 174 bent to extend vertically downwardly near shaft 42. At its downstream end, the guide member 172 merges into an inclined guide extension 175 which extends toward the center of hub 159.

The frame 11 supports an arcuate finger guide 176 so that it is concentric to the shaft 41, the finger guide 176 having a radius slightly greater than that of the sprocket 43. The arcuate finger guide 176 merges at its downstream end into a straight finger guide 177 which extends downwardly at an incline. Adjacent the arcuate finger guide 176 is an arcuate guide extension 179 which has a radius approximately the same as that of the finger guide 176 and which merges into a horizontally extending guide member 178 disposed adjacent the chain guide 54 and disposed directly vertically beneath the guide members 161 and 172.

One end of a curved guide member 182 is pivotally supported adjacent the downstream end of the guide member 178 by an axle 183. The frame 11 supports a stationary curved guide 184 which is concentric to shaft 42 and spaced radially outwardly from arcuate guide extension 162. The guide member 182 can pivot between a position shown in solid lines, in which its outer end is adjacent and aligned with the outer end of arcuate guide extension 162, and a position shown in broken lines, in which its outer end is disposed against the lower end of the stationary curved guide 184.

Movement of the guide member 182 is controlled by a conventional pneumatically-actuated cylinder 186 having one end coupled to a bracket 187 on the guide member 182 and having its opposite end coupled to a stationary bracket 188 provided on the frame 11. The pneumatic cylinder 186 is controlled by a conventional control unit which is shown diagrammatically at 189 and which is responsive to movement of the guide members 36 and 37, as described later.

A further guide arrangement is provided on the axially outer sides of the sprockets 44 and 47, and is a mirror image of the guide arrangement shown in FIG. 1. Accordingly, it is not illustrated and described in detail, except that in FIG. 3 horizontal guide members 191, 192 and 193 of this guide arrangement are visible and correspond functionally to guide members 161, 172 and 178, respectively.

OPERATION

The operation of the conveyor of FIGS. 1–8 will now be briefly described. For purposes of this description, it will be assumed that the guide members 36 and 37 (FIG. 3) are initially disposed further laterally outwardly than is shown in FIG. 3, for example so that the surfaces 38 and 39 are respectively over the outermost bars 16. For this position of the guide members 36 and 37, the control unit 189 causes the pneumatically-actuated cylinder 186 to retract, thereby positioning the movable guide member 182 in the broken line position of FIG. 1, in which its outer end engages the curved guide 184.

Figure 6:
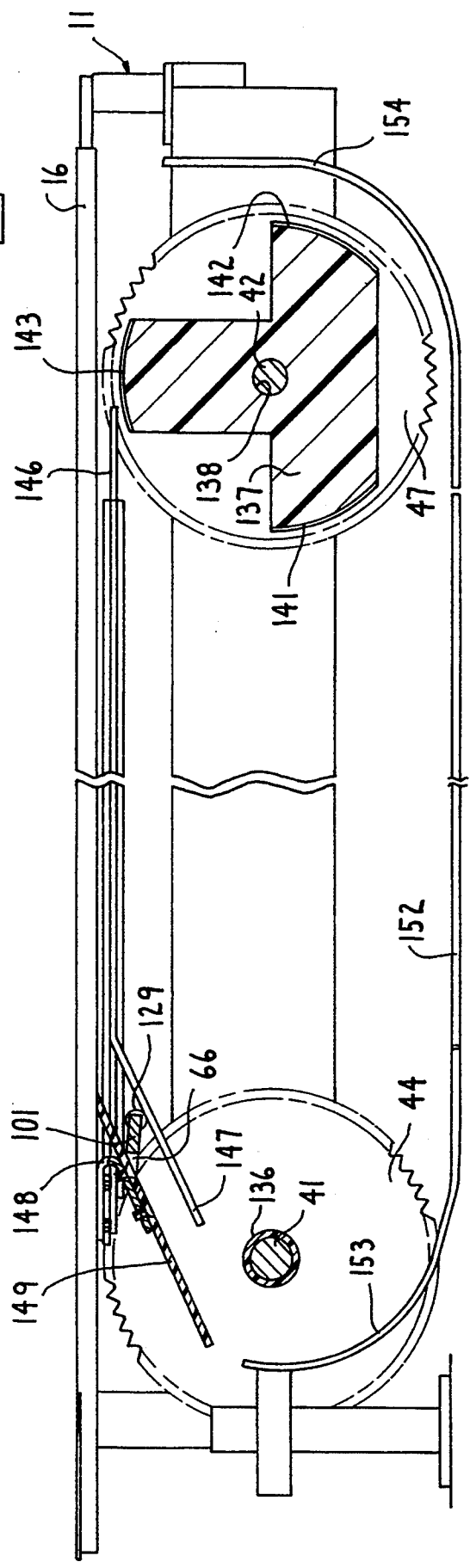
FIG. 6 is a sectional side view of the conveyor of FIG. 1, taken along the line 6—6 in FIG. 3.

Referring to FIG. 6, as the shaft 41 and the sprockets on it rotate in a counterclockwise direction, the pushing assemblies are moved by the endless lengthwise movement of the chains. Referring to FIGS. 4 and 6, assume that one of the pushing assemblies is disposed along the upper reach of the chains and has its roller 129 supported on and rolling along the guide member 146. This positions the connecting member 101 at a vertical level so that the four pushing fingers 117 on connecting member 101 extend upwardly through respective slots between the rods 16 and project above the top surfaces of the rods, as shown in FIG. 3. As the roller 129 reaches the downstream end of the guide member 146, the forward edge of connecting member 101 engages the inclined guide plate 149, which forces the connecting member 101 to move downwardly so that the roller 129 remains in contact with the inclined guide extension 147, the support members 62 and 66 thereby being pivoted downwardly relative to the chain. This pulls the pushing fingers 117 downwardly within the slots 17 until the upper ends of the fingers are below the rods 16. When the roller 129 reaches the end of the guide extension 147, the connecting member 101 drops vertically downwardly onto the top of hub 136. As the chain carries the pins 63 and 68 around the sprockets 43 and 44, the connecting member 101 is pulled counterclockwise around the hub 136 until it drops downwardly onto the arcuate extension 153 in an upside down position with the roller 129 engaging extension 153. Continued movement of the chains causes the roller 129 to roll along the extension 153, then along the guide member 152 and then onto extension 154. The T-shaped guide member 137 rotates with shaft 42, and is angularly oriented on the shaft so that, as each of the pushing assemblies 59 reaches the sprockets 46 and 47, one of the surfaces 141–143 is angularly aligned with the connecting member 101 and roller 129 of the pushing assembly. As the chains pull the pins 63 and 68 around the sprockets 46 and 47, the connecting member 101 will also be pulled around the circumference of the sprockets while swinging from a position in which the roller 129 engages the guide extension 154 to a position in which the roller 129 is disposed against the adjacent one of the surfaces 141–143. As the arms 62 and 66 are pivoted back to a horizontal position, the pushing fingers 117 move upwardly through respective slots between the bars 16 until they are again projecting upwardly above the support surface on the bars. Then, the roller 129 moves from the guide member 137 back onto the upper side of guide member 146.

Turning now to FIG. 1, when one of the pushing assemblies 59 is moving along guide member 161 with the upper reaches of the chains, the support member 61 is horizontal and the rollers 72, 81 and 82 are all supported on the guide member 161. As the pushing assembly reaches the downstream end of the guide member 161, the magnet 168 (FIG. 7) attracts the metal roller 82 in order to ensure that the roller 82 rolls down the inclined guide extension 163, so that the pushing finger 85 is pulled downwardly to a position below the bars 16. When the roller 82 is pulled off the end of the guide extension 163, it drops onto the top of the hub 159. As the chain pulls roller 72 around the circumference of the sprocket 43, the arm 61 is turned upside down and the tip of the finger 85 drops under the force of gravity into engagement with the arcuate finger guide 176. Continued movement of the chain causes the tip of the finger to slide from arcuate finger guide 176 onto straight finger guide 177, by which the rollers 81 and 82 are gradually lowered into engagement with the guide member 178, after which the finger 85 moves out of engagement with the guide 177. The rollers 81 and 82 then roll along the guide member 178 as the chain moves along its lower reach.

As previously mentioned, the movable guide member 182 is assumed to be initially in the position shown in broken lines in FIG. 1. Therefore, when the pushing assembly reaches movable guide member 182, the roller 72 and the rollers 81 and 82 are each guided into the region between arcuate extension 162 and curved guide 184. As the chain proceeds around the sprocket 46, the rollers 72, 81 and 82 move along the arcuate extension 162 and back onto the top of guide member 161, while the finger 85 moves back upwardly through a slot 17 until it again projects upwardly above the bars 16. The rollers 74, 96 and 97 (FIG. 4), of course, control the support member 67 for pushing finger 99 in a similar manner.

Referring to FIGS. 2 and 3, if the shafts 23 and 24 are now rotated for a period of time so that the guide members 36 and 37 move inwardly to the positions shown in FIG. 3, the control unit 189 of FIG. 1 will extend the pneumatically-actuated cylinder 186 so that the movable guide member 182 is moved to the position shown in solid lines in FIG. 1, with the following effect.

As a pushing assembly 59 moves with the lower reach of the chain and reaches the guide member 182, the roller 72 must follow the chain along the circumference of the sprocket 46 and it therefore forces the guide member 182 to pivot downwardly against the resilient urging of the air in the pneumatically-actuated cylinder 186, so that the roller 72 moves into the region between arcuate extension 162 and curved guide 184. As soon as the roller 72 has passed the guide member 182, the pressurized air supplied to cylinder 186 causes the cylinder 186 to be automatically and immediately reextended. Consequently, the movable guide member 182 is promptly returned to the position shown in solid lines in FIG. 1, and guides the rollers 81 and 82 into the region between the guide extension 173 and the guide extension 162. As the chain continues around the sprocket 46, the rollers 81 and 82 will swing into engagement with the extension 173 and its end portion 174, and will be guided onto the upper side of the guide member 172. This is the position of support member 61 shown in FIG. 3. In this position, the upper end of the pushing finger 85 does not project above the tops of the bars 16. Therefore, the finger 85 does not engage the guide member 37 which is now disposed directly above it. In an analogous manner, pushing finger 99 is also positioned so that its upper end is below the bars 16 and it does not engage guide member 36. Consequently, only the pushing fingers 117 on the connecting member 101 are effective for pushing product along the conveyor.

Still referring to FIG. 1, as the roller S2 reaches the end of the guide member 172, it moves downwardly along the inclined extension 175 until it moves off the extension 175 and drops onto the hub 159. From this point, until the pushing assembly again reaches the movable guide member 182, the operation is the same as that already described above.

If the shafts 23 and 24 (FIGS. 2 and 3) are again rotated so as to move the guide members 36 and 37 outwardly, the control unit 189 will automatically retract the pneumatically-actuated cylinder 186 to move the guide member 182 back to the position shown in broken lines, in which the rollers 81 and 82 are guided onto the uppermost guide member 161 so that the pushing finger 85 again projects upwardly beyond the tops of the bars 16 as the pushing assembly moves along the upper reach of the chain. In an analogous manner, pushing finger 99 is again positioned so that it projects above the bars 16. Thus, the pushing fingers 85 and 99 are again effective for pushing product along the conveyor.

Although a single preferred embodiment of the invention has been described in detail for illustrative purposes, it will be recognized that there are variations or modifications of the disclosed conveyor, including the rearrangement and reversal of parts, which lie within the scope of the present invention.

The embodiments of the invention in which an exclusive property or privilege is claimed are defined as follows:

1. An apparatus comprising: means defining an upwardly facing support surface; a movably supported drive member and drive means for effecting movement of said drive member along a path of movement which includes a portion approximately parallel to said support surface; pushing means for sliding an article in a direction of movement on said support surface, said pushing means including a first pushing portion supported on said drive member and engageable with an article on said surface as said first pushing portion moves with said drive member in said direction of movement along said portion of said path of movement, and a second pushing portion supported for movement relative to said drive member between operational and retracted positions in which it is respectively engageable with and free of engagement with an article on said surface as said second pushing portion moves with said drive member in said direction of movement along said portion of said path of movement; first and second elongate guide surfaces extending substantially parallel to each other and substantially parallel to said support surface, said second pushing portion being coupled to a guide part which respectively moves along a respective one of said first and second guide surfaces as said drive member moves along said portion of said path of movement to thereby position said second pushing portion in a respective one of said operational and retracted positions with respect to said drive member; a movable guide member provided at a location along said path of movement prior to said portion of said path of movement and engageable with said guide part; control means for selectively positioning said guide member in a selected one of first and second positions, said guide part engaging said guide member and being guided by said guide member in response to movement of said drive member to one of first and second positions with respect to said guide member; and means responsive to said guide member being respectively in said first and second positions for guiding said guide part respectively into engagement with said first and second guide surfaces.

2. An apparatus according to claim 1, including a guide rail supported above said support surface for movement in a direction transverse to said direction of movement, said control means including means responsive to movement of said guide rail in said transverse direction from a first position to a second position for moving said guide member from said first position thereof to said second position thereof.

3. An apparatus according to claim 1, wherein said pushing means includes an elongate support member which has a first end supported on said drive member for pivotal movement about a pivot axis extending transversely to said direction of movement and approximately parallel to said support surface, said second pushing portion being a pushing finger projecting transversely outwardly from a second end of said support member, and said guide part being a roller supported at said second end of said support member for rotational movement about an axis approximately parallel to said pivot axis.

4. An apparatus according to claim 3, wherein said support surface has two slots therethrough which each extend approximately parallel to said direction of movement, said portion of said path of movement of said drive member being below said support surface and said first and second pushing portions each projecting upwardly through a respective slot as said drive member moves along said portion of said path of movement with said second pushing portion in said operational position; wherein said drive member is part of an endless chain movably supported below said support surface on first and second sprockets respectively rotatably supported by first and second shafts each extending substantially parallel to said pivot axis; wherein said portion of said path of movement of said drive member corresponds to movement thereof along a portion of an upper reach of said chain; including a further guide surface extending parallel to and disposed below said first and second guide surfaces, said guide roller engaging said further guide surface as said drive member moves along a lower reach of said chain; including an arcuate extension extending from an upstream end of said first guide surface approximately circumferentially adjacent said first sprocket; including an extension portion which extends from an upstream end of said second guide surface to a location adjacent said first shaft; and wherein said guide member has a first end supported adjacent an end of said further guide surface nearest said first sprocket for pivotal movement about an axis extending substantially parallel to said pivot axis, said movement of said guide member between said first and second positions thereof causing a second end of said guide member to move between a position adjacent and a position spaced radially outwardly from an upstream end of said arcuate extension for said first guide surface.

5. An apparatus according to claim 4, including a hub provided on said second shaft; including at the downstream ends of said first and second guide surfaces respective extensions which each extend to a location near said hub so as to guide said second end of said support member into engagement with said hub as said drive member moves around said second sprocket; and including a pushing portion guide surface having a downwardly inclined portion and having an approximately arcuate portion which is approximately concentric to said hub and Which merges into said downwardly inclined portion, an end of said second pushing portion remote from said support member moving into engagement with said pushing portion guide surface as said drive member moves around said second sprocket, wherein as said second pushing portion moves along said inclined portion of said pushing portion guide surface said guide roller is gradually lowered into engagement with said further guide surface and then said second pushing portion moves out of engagement with said pushing portion guide surface.

6. An apparatus according to claim 5, wherein said control means includes a pneumatically-actuated cylinder having a first end which is coupled to said guide member and a second end which is stationarily supported.

7. An apparatus according to claim 5, wherein said extension at said downstream end of said first guide surface is downwardly inclined and includes a magnet, and wherein said guide roller is made of metal, said magnet causing said guide roller to remain in contact with said downstream extension of said first guide surface as said guide roller moves therealong.

8. An apparatus according to claim 5, wherein said pushing means includes a further support member having a first end supported on an opposite side of said drive member from said first-mentioned support member for pivotal movement about said pivot axis, said first pushing portion projecting outwardly from a second end of said further support member, said further support member having at said second end thereof a guide roller supported for rotation about an axis parallel to said pivot axis; including an additional guide surface disposed below and extending parallel to said support surface, said guide roller on said further support member moving along said additional guide surface as said drive member moves along said portion of said path of movement; including a further hub provided on said second shaft on an opposite side of said second sprocket from said first-mentioned hub; including an additional extension surface extending downwardly at an incline toward said further hub from a downstream end of said additional guide surface; and including an inclined and downwardly facing guide surface provided above said additional extension surface and means on said further support member engageable with said downwardly facing guide surface for maintaining said guide roller on said further support member in contact with said additional extension surface.

9. An apparatus according to claim 8, including an upwardly facing guide surface which is disposed below said additional guide surface, is engageable with said guide roller on said further support member as said drive member moves along said lower reach of said chain, and merges at a downstream end thereof into an arcuate extension approximately concentric to said first shaft; and including a guide part supported on said first shaft for rotation therewith and having thereon a radially outwardly facing surface which passes near an upstream end of said additional guide surface as said guide part rotates and which is engageable with structure at said second end of said further support member for pivotally positioning said further support member so that said guide roller thereon is guided back onto said additional guide surface at said upstream end thereof.

10. An apparatus comprising: means defining an upwardly facing support surface having a slot therein; a drive member supported for movement along a path of movement which includes a portion substantially parallel to said slot; pushing means for sliding an article along said support surface in a direction parallel to said slot, wherein said pushing means includes a support member movably supported on said drive member and having thereon a pushing portion and a guide part; an upwardly facing guide surface disposed below and extending parallel to said support surface and merging at a downstream end thereof into a downwardly inclined extension, said guide part being engageable with said guide surface as said drive member moves along said portion of said path of movement to maintain said support member in a position in which said pushing portion projects upwardly through said slot and above said support surface; and proximity-maintaining means for ensuring that said guide part moves downwardly along said inclined extension so that said pushing portion moves downwardly relative to said support surface to a position in which an upper end of said pushing portion is disposed below said support surface; wherein said proximity-maintaining means includes said guide part being made out of metal and includes said inclined extension having means for generating a magnetic field.

11. An apparatus according to claim 10, wherein said inclined extension includes a forked portion having two spaced legs, said means for generating a magnetic field being a magnet disposed between said legs, and includes a bolt and nut cooperable with outer ends of said legs for pressing said legs toward each other to fixedly clamp said magnet therebetween.

12. An apparatus according to claim 10, wherein said guide part is a metal roller rotatably supported on said support member.

13. An apparatus comprising: means defining an upwardly facing support surface having a slot therein; a drive member supported for movement along a path of movement which includes a portion substantially parallel to said slot; pushing means for sliding an article along said support surface in a direction parallel to said slot, wherein said pushing means includes a support member movably supported on said drive member and having thereon a pushing portion and a guide part; an upwardly facing guide surface disposed below and extending parallel to said support surface and merging at a downstream end thereof into a downwardly inclined extension, said guide part being engageable with said guide surface as said drive member moves along said portion of said path of movement to maintain said support member in a position in which said pushing portion projects upwardly through said slot and above said support surface; and proximity-maintaining means for ensuring that said guide part moves downwardly along said inclined extension so that said pushing portion moves downwardly relative to said support surface to a position in which an upper end of said pushing portion is disposed below said support surface; wherein said proximity-maintaining means includes a downwardly-facing and inclined guide surface disposed above and extending parallel to said inclined extension, and includes a member secured to said support member near said guide part and engageable with said inclined guide surface to maintain said guide part in proximity to said inclined extension surface.

14. An apparatus according to claim 13, wherein said guide part is a roller rotatably supported on said support member.

15. An apparatus according to claim 13, wherein said support member has a first end supported on said drive member for pivotal movement about a pivot axis extending transversely to said direction of movement and approximately parallel to said support surface, said guide part and said pushing portion being provided at a second end of said support member remote from said first end thereof.

16. An apparatus comprising: means defining an upwardly facing support surface having a plurality of spaced and parallel slots therein; first and second elongate drive chains having respective portions disposed below and extending parallel to said support surface and said slots therein; drive means for effecting simultaneous lengthwise movement of said portions of said drive chains in the same direction at the same speed; first and second elongate support members disposed on opposite sides of said first chain and each having a first end supported on said first chain for pivotal movement about a pivot axis extending transversely to said chains and approximately parallel to said support surface, and third and fourth support members disposed on opposite sides of said second chain and each having a first end supported on said second chain for pivotal movement about said pivot axis; a connecting member extending between and fixedly coupled to second ends of said second and third support members; a first guide roller supported on said connecting member for rotation about an axis parallel to said pivot axis; a plurality of upwardly projecting first pushing fingers provided on said connecting member; a first upwardly facing guide surface disposed below and extending parallel to said support surface and said slots therein, said first guide roller rolling along said first guide surface with said first pushing portions projecting upwardly through respective slots in said support surface to locations above said support surface and moving along said slots in response to movement of said portion of said chains; second and third guide rollers supported respectively on said first and fourth support members at said second, ends thereof for rotation about axes parallel to said pivot axis; upwardly projecting second and third pushing fingers provided respectively on said first and fourth support members at said second ends thereof; and second and third upwardly facing guide surfaces each parallel to said first guide surface and each engageable with a respective one of said second and third guide rollers for maintaining said first and fourth support members in positions in which said pushing fingers thereon project upwardly through respective slots in said support surface to locations above said support surface, said first, second and third pushing fingers each moving in a lengthwise direction along a respective said slot in response to movement of said portions of said chains.

17. An apparatus according to claim 16, including a fourth guide surface disposed below and extending parallel to said second guide surface and a fifth guide surface disposed below and extending parallel to said third guide surface, said second and third guide rollers being respectively engageable with and movable along said fourth and fifth guide surfaces during movement of portions of said chains for positioning said first and fourth support members in positions in which upper ends of said second and third pushing fingers thereon are disposed lower than said support surface; including first and second guide rails which are provided above said support surface and extend parallel to said slots and means supporting said guide rails for movement in directions transverse to said slots between inner and outer positions in which each said guide rail is respectively disposed above and is spaced laterally outwardly from a respective one of said slots for said second and third pushing fingers; and means responsive to said guide rails being respectively in said outer and inner positions for automatically guiding said second guide roller into engagement respectively with said second and fourth guide surfaces and said third guide roller into engagement respectively with said third and fifth guide surfaces.

18. An apparatus according to claim 17, wherein said first and fourth support members each have a further guide roller supported thereon adjacent said second end thereof for rotation about an axis parallel to said pivot axis, and including an additional guide roller supported on each of said chains adjacent said first ends of said first and fourth support members for rotation about an axis parallel to said pivot axis.

19. An apparatus according to claim 18, including two elongate chain support members each disposed below and slidably supporting said portion of a respective said chain.

20. An apparatus according to claim 16, wherein said first, second and third pushing fingers each have thereon a pushing surface which is inclined to extend upwardly and rearwardly with respect to a direction of movement of the pushing finger relative to said support surface.

21. An apparatus comprising: means defining an upwardly facing support surface; a movably supported drive member and means for effecting movement of said drive member along a path of movement having a portion extending substantially parallel to said support surface; an elongate support member having a first end supported on said drive member for pivotal movement about a pivot axis transverse to a direction of movement of said drive member and approximately parallel to said support surface; means supporting a first guide roller adjacent said first end of said support member for rotation about an axis parallel to said pivot axis and means supporting a second guide roller on said support member adjacent a second end thereof for rotation about an axis substantially parallel to said pivot axis; a pushing portion projecting outwardly from said second end of said support member; first and second vertically spaced guide surfaces each extending approximately parallel to said support surface, wherein when said second guide roller is respectively engaging said first and second guide surfaces as said drive member moves along said portion of said path of movement said pushing portion is respectively disposed in positions engageable with and spaced from an article slidably provided on said support surface; a guide member supported for movement between first and second positions; control means for positioning said guide member in a selected one of said first and second positions, wherein when said guide member is positioned in one of said first and second positions, said control means yieldably resists movement of said guide member away from said one of said positions toward the other of said first and second positions; and guide means responsive to said guide member being respectively in said first and second positions for guiding said second guide roller from said guide member to said second guide surface and said first guide surface, respectively; wherein as said first guide roller moves with said drive member along said path of movement while said guide member is in said one of said positions, said first guide roller engages said guide member and forces said guide member to move away from said one of said positions against the urging of said control means, said guide member thereafter being returned by said control means to said one of said positions and said second guide roller being thereafter guided by said guide member and said guide means to one of said first and second guide surfaces.

22. An apparatus according to claim 21, wherein said control means includes a pneumatically-actuated cylinder having a first end which is coupled to said guide member and a second end which is stationarily supported, said cylinder moving from a retracted position to an extended position to effect movement of said guide member from said other of said first and second positions to said one of said first and second positions, and being movable against the urging of air pressure supplied thereto by said control means from said extended position toward said retracted position as said first roller engages and moves said guide member away from said one of said positions, the air pressure supplied to said cylinder thereafter returning said cylinder to said extended position.

23. An apparatus according to claim 10, wherein said support member has a first end supported on said drive member for pivotal movement about a pivot axis extending transversely to said direction of movement and approximately parallel to said support surface, said guide part and said pushing portion being provided at a second end of said support member remote from said first end thereof.

* * * * *